United States Patent [19]

Altizer, Sr.

[11] Patent Number: 5,720,400
[45] Date of Patent: Feb. 24, 1998

[54] PORTABLE HOIST DEVICE

[76] Inventor: Joseph W. Altizer, Sr., 1910 W. Cone Blvd., Greensboro, N.C. 27408

[21] Appl. No.: 752,956

[22] Filed: Nov. 20, 1996

[51] Int. Cl.$^6$ ............................................. B66C 23/36
[52] U.S. Cl. ........................ 212/180; 212/331; 212/346
[58] Field of Search .................................. 212/180, 306, 212/324, 325, 343, 344, 345, 331, 346

[56] References Cited

U.S. PATENT DOCUMENTS

| | | | |
|---|---|---|---|
| 581,486 | 4/1897 | Lavery | 212/346 |
| 799,865 | 9/1905 | McConnell | 212/346 |
| 2,156,424 | 5/1939 | Barnard | 212/325 |
| 2,177,525 | 10/1939 | Henderson | 212/306 |
| 2,335,446 | 11/1943 | Richardson | 212/346 |
| 2,424,899 | 7/1947 | Priester | 212/325 |
| 2,504,232 | 4/1950 | Smith | 212/306 |
| 2,562,189 | 7/1951 | Harris | 212/306 |
| 2,946,460 | 7/1960 | Insolio et al. | 212/346 |
| 3,339,753 | 9/1967 | Forster et al. | 212/346 |
| 4,429,355 | 1/1984 | Garchinsky | 362/403 |
| 5,028,198 | 7/1991 | Buhr | 212/324 |

*Primary Examiner*—Thomas J. Brahan

[57] ABSTRACT

A portable hoist is provided for lifting and moving heavy loads a short distance. The hoist has a rectangular frame which supports a movable carriage containing a winch and pulley. The rectangular frame is adjustable along corner legs which allows individual leg adjustment. Parallel longitudinal side frame members include tracks and channels for rollers to support and direct the carriage along the frame. The winch can be operated by an electric hand drill to enable an individual to move and lift several hundred pounds without assistance.

14 Claims, 5 Drawing Sheets

5,720,400

PORTABLE HOIST DEVICE

BACKGROUND OF THE INVENTION

1. Field of the Invention

The invention herein pertains to hoists as used for lifting and moving various objects and particularly heavy objects by hoists that are portable.

2. Description of the Prior Art and Objectives of the Invention

Various types of hoists have been installed and used in factories, warehouses and other buildings for many years for lifting and moving machinery, various equipment and other heavy items. Such hoists are generally stationery in that they cannot be easily disassembled and moved from one location to another without laborious disassembly and reassembly. Pickup and other trucks are constantly used to haul heavy loads including machinery and equipment which, because of high weight cannot be lifted by an individual. For example, refrigeration compressors are made of cast steel and normally weigh 300–400 lbs for a relatively small refrigeration unit. Such compressors are frequently exchanged and require delivery from the repair shop to the refrigeration site which may be across town. In such cases, several people are required to manually lift the compressor onto a pickup truck or else a pneumatic crane or other suitable mechanical equipment is required to lift the compressor, both during loading and unloading.

Thus, with the problems and inconveniences associated with lifting and moving heavy equipment and other objects, it is an objective of the present invention to provide a portable hoist which can be easily assembled and disassembled by an individual and used for lifting and moving heavy objects at different sites.

It is another objective of the present invention to provide a portable hoist device to load and unload heavy objects from pickup truck beds by a sole operator.

It is still a further objective of the present invention to provide a portable hoist device which includes a plurality of adjustable legs.

It is a further objective of the present invention to provide a portable hoist device which includes a rigid frame having carriage tracks whereby a hoisted object can be easily rolled along.

It is yet another objective of the present invention to provide a hoist device which can be powered by an electric hand drill.

Various other objectives and advantages of the present invention will become apparent to those skilled in the art as a more detailed description is set forth below.

SUMMARY OF THE INVENTION

The aforesaid and other objectives are realized by providing a portable hoist which includes a rigid rectangular steel frame having a series of channels for receiving rollers therein. A carriage is provided which includes a winch and pulley whereby a load can be attached to the cable wound on the winch and which passes through the pulley to the load. The carriage is supported between a pair of longitudinal side members of the frame which includes sleeves that are adjustably connected to corner legs. Thus, each of the legs can be adjusted to individual heights as needed to maintain the frame in a level, horizontal position. The winch includes a gear which meshes with a threaded drill connector which can be rotated with a standard electric hand drill. A load weighing 300 lbs or more can be attached to the cable and with an electric hand drill, the load can be easily lifted several feet above the ground and then manually pushed along the frame by the carriage. The load can thereafter be lowered, such as into a pickup truck bed for transportation. Upon arrival at the desired site, the portable hoist can be easily reassembled for unloading the heavy load.

DETAILED DESCRIPTION OF THE PREFERRED EMBODIMENT AND OPERATION OF THE INVENTION

Figure 1:
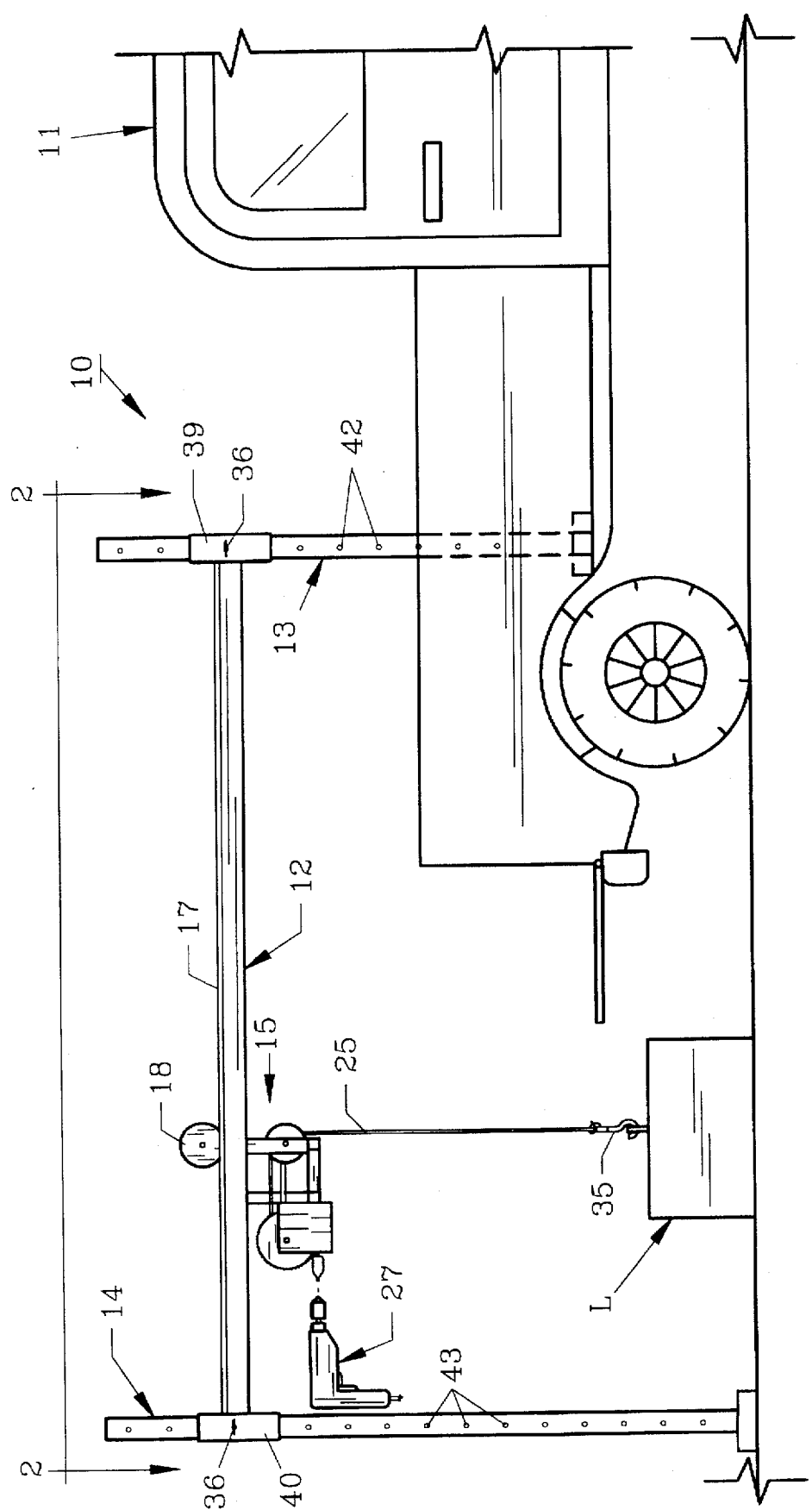
FIG. 1 illustrates an elevational view of the preferred portable hoist device of the invention as used to load and unload heavy objects to and from a pickup truck.
Figure 2:
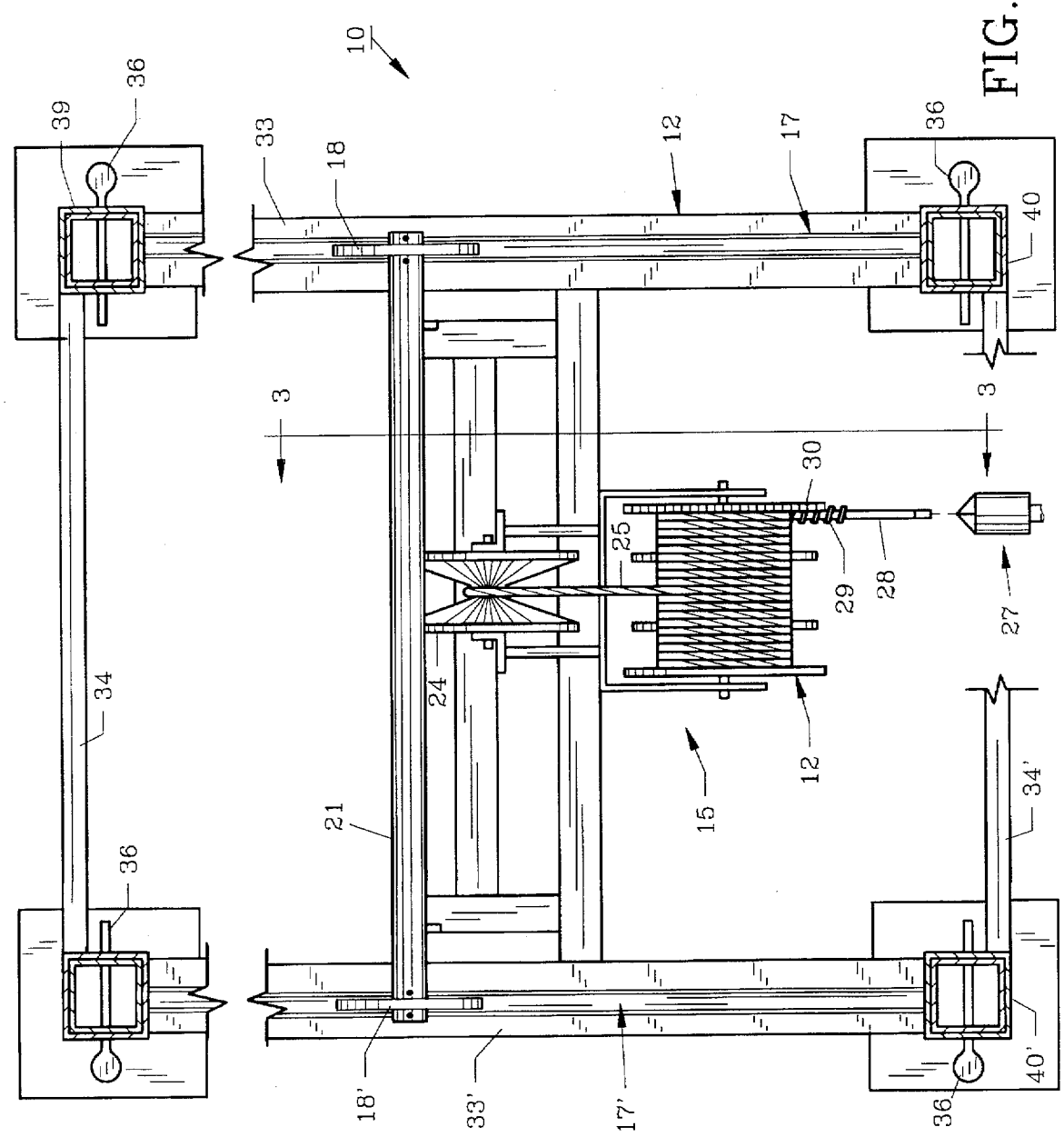
FIG. 2 demonstrates a top fragmented version of the portable hoist device as shown along lines 2—2 in FIG. 1.
Figure 5:
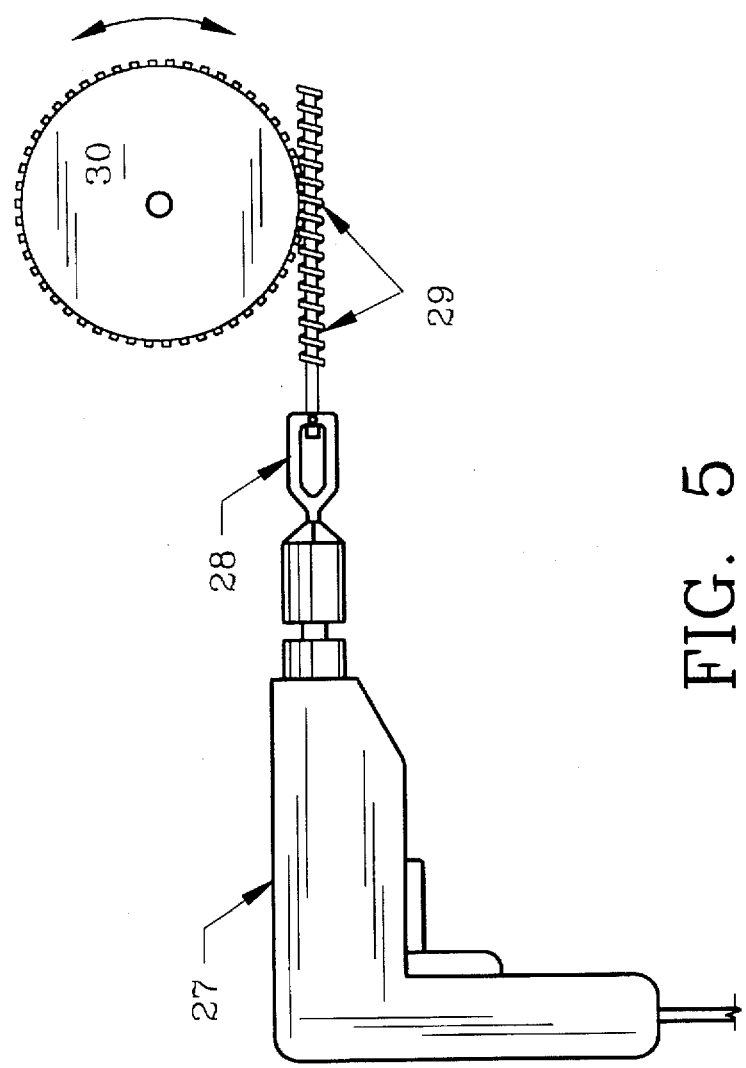
FIG. 5 features an enlarged view of the drill and drill connector as seen in FIG. 1, but with the drill joined thereto.

For a better understanding of the invention and its operation, turning now to the drawings, FIG. 1 demonstrates the preferred form of portable hoist 10 positioned partially on pickup truck 11. Frame 12 of hoist 10 is rectangularly shaped and, as seen in FIG. 2, includes longitudinal members 33, 33' and transverse members 34, 34' formed from steel. Pins 36 are used to adjust the height of frame 12 along legs 13, 13', 14, 14' as also seen in FIG. 2. Frame 12 includes corner sleeves 39, 39', 40, 40' joined such as by welding to longitudinal members 33, 33' and lateral members 34, 34', for adjustably positioning along legs 13, 13', 14, 14' by placing pins 36 through openings 42, 42' (opening 42' not shown) respectively in legs 13, 13' and through openings 43, 43' respectively in legs 14, 14' as seen in FIG. 1, to change the height of frame 12 as required. As would be understood, portable hoist 10 can be used, for example, to lift load L, as shown in FIG. 1, with the assistance of conventional electric hand drill 27. With load L lifted from the ground a sufficient height for placement in the bed of pickup truck 11 by hand drill 27, carriage 15 is manually urged forward, from left to right, as seen in FIG. 1, whereby carriage 15 (with load L) then rolls toward leg 13. When sufficient forward movement has been made by carriage 15, hand drill 27 is then used to rotate connector 28 to allow gear 30 (FIG. 5), which drives winch 26, to be turned in a reverse direction allowing cable 25 to extend and lower load L into the bed of pickup truck 11.

Portable hoist 10 can be quickly disassembled by the removal of legs 13, 13', 14, 14' from frame 12 and placed with load L in pickup truck 11 and carried to a desired location where it can again be quickly assembled. Load L can then be lifted and removed from pickup truck 11 by a sole worker. Frame 12 is joined to four adjustable square tubular legs 13, 13', 14, 14' with front legs 13, 13' being somewhat shorter than rear legs 14, 14'. As also shown in FIG. 1, carriage 15 is movably positioned along frame 12 by rolling carriage 15 on upper rails 17, 17' as shown in FIGS. 3 and 4.

Figure 3:
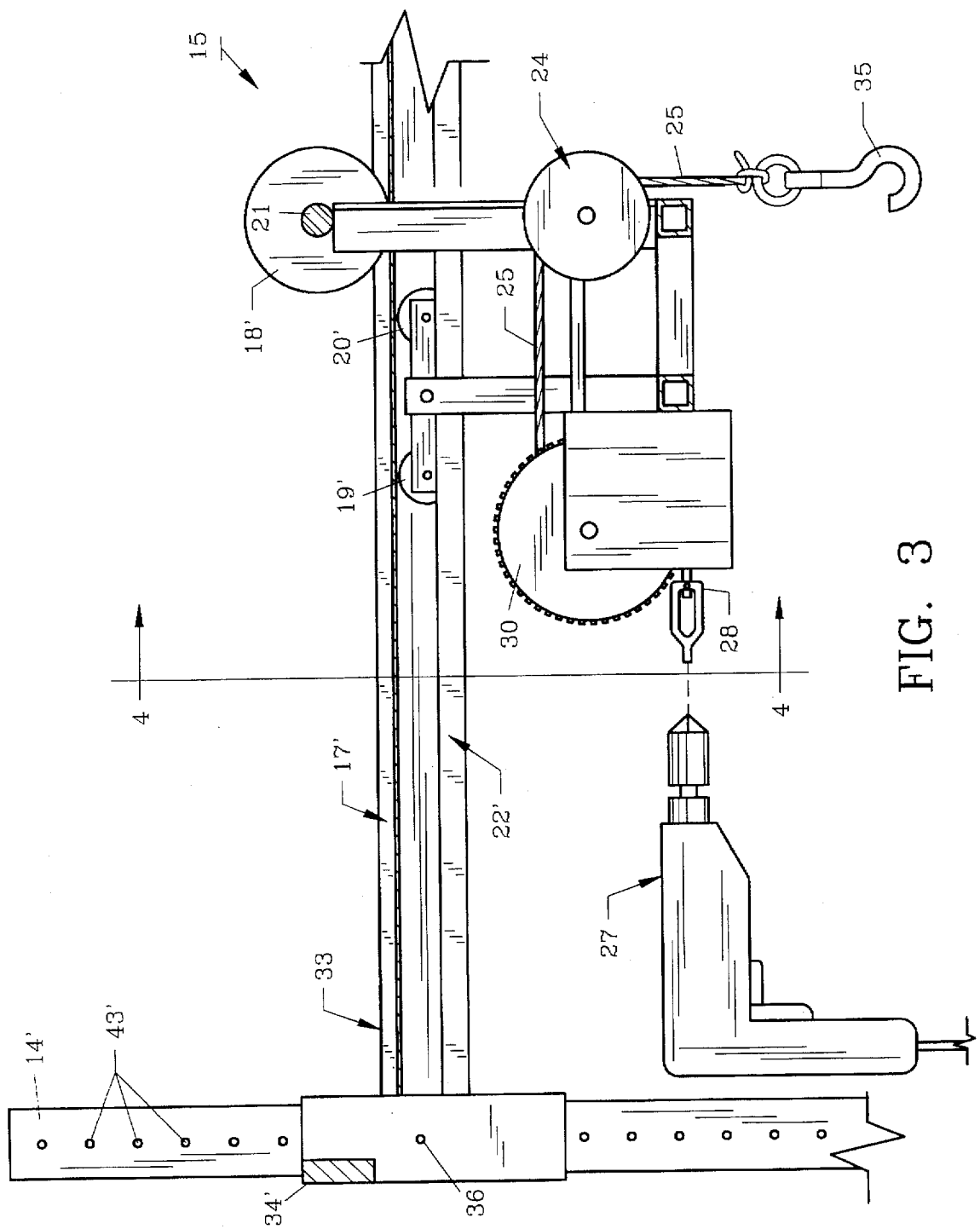
FIG. 3 shows a close-up side view of the carriage of the portable hoist device as seen along lines 3—3 of FIG. 2.
Figure 4:
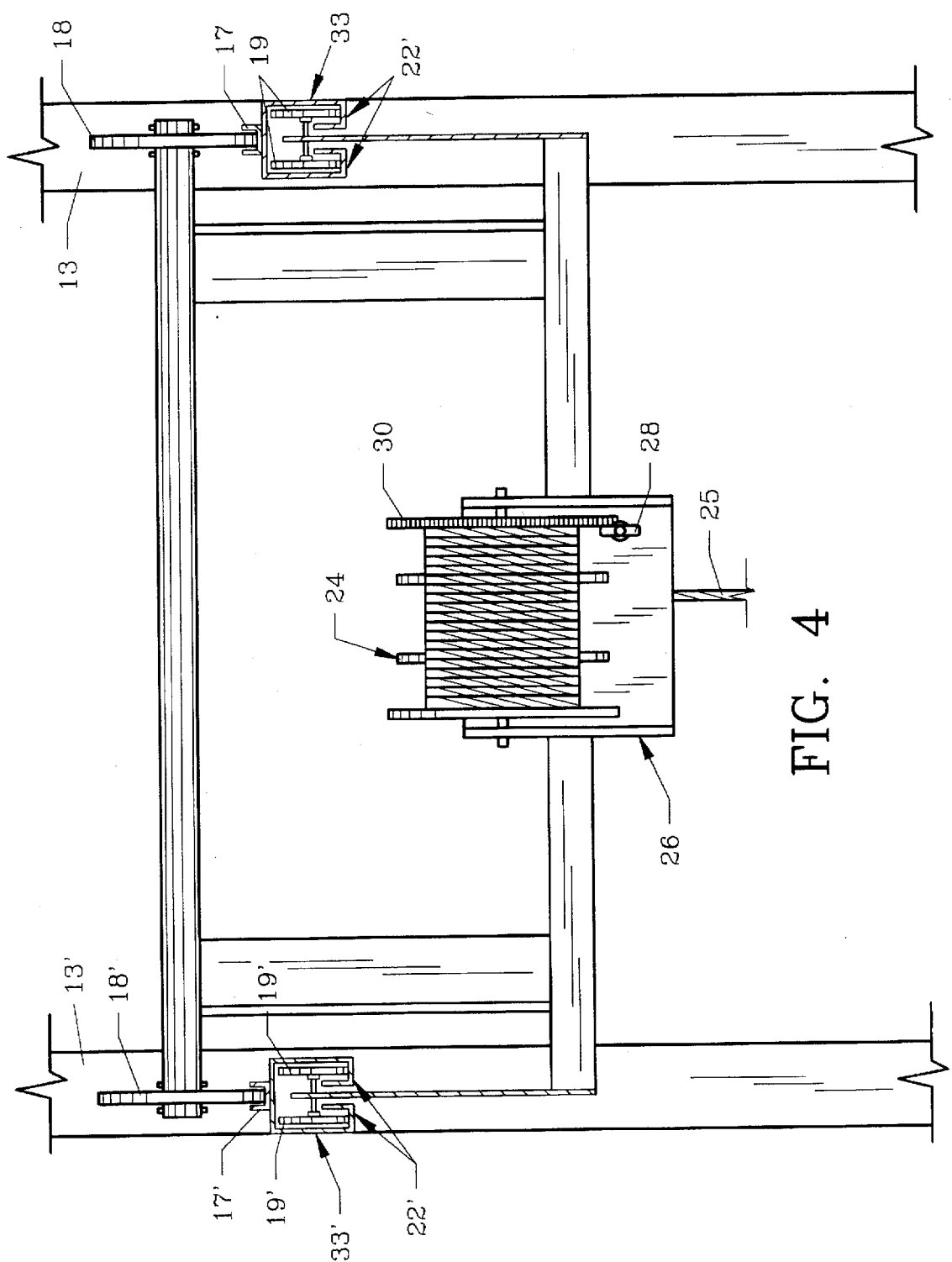
FIG. 4 depicts an end view of the hoist device of FIG. 3 as seen along lines 4—4.

In FIG. 3 a close-up side view of carriage 15 is seen whereby roller 18' is mounted within track 17' while tandem roller pairs 19' 20' are mounted beneath track 17' and within channel 22', seen also in FIG. 4. Axle 21 as shown, is formed of steel as are rollers 18, 18', and provides needed rigidity during lifting and moving of heavy loads. Channels 22, 22' are respectively attached to longitudinal members 33, 33'. Tandem roller pairs 19, 20, are contained within channels 22, beneath track 17 as also shown in FIG. 4 (front roller pair 20 not shown). Pairs of tandem rollers 19, 20 (20 not shown), 19', 20' are provided to allow load L, as shown in FIG. 1, to be easily moved. Load L may consist of a heavy piece of machinery, such as a refrigeration compressor or otherwise and may weigh, for example, 300 or more pounds. Portable hoist device 10 as described herein will allow one small operator to hoist and move load L with very little effort.

In FIG. 2 a top fragmented view of portable hoist 10 is seen along lines 2—2 of FIG. 1. Carriage 15 includes pulley 24 which supports cable 25 attached to winch 26. Winch 26 may be manually operated although in the preferred embodiment herein a conventional electric hand drill 27 is joined to connector 28 for forward and reverse rotational purposes and as would be understood, acts as a means to operate winch 26. Connector 28 includes worm thread 29 which meshes with gear 30 mounted to winch 26 which is standard as seen in FIG. 2. Gear 30 is seen removed from winch 26 in FIG. 5 for clarity. Winch 26, drill connector 28 and worm thread 29 are standard items of commerce but could be modified by attaching a manual handle thereto as needed as in an alternate embodiment.

The illustrations and examples provided herein are for explanatory purposes and are not intended to limit the scope of the appended claims.

I claim:

1. A hoist device for a truck comprising: a frame mountable on a truck, a pair of tracks, said pair of tracks supported on said frame, a carriage, said carriage movably positioned on said pair of tracks, said carriage comprising an axle, a pair of rollers, said rollers positioned on said axle, a pulley, said pulley suspended from said axle, a winch, a cable, said cable wound on said winch and positioned on said pulley, each of said pair of rollers located on different ones of said pair of tracks, two pairs of tandem rollers, each of said pair of tandem rollers attached to said winch on opposite sides thereof beneath different ones of said tracks, whereby a load can be connected to said cable and lifted by said winch and moved along said pair of tracks.

2. The hoist of claim 1 further comprising a drill connector, said drill connector attached to said winch.

3. The hoist of claim 1 further comprising a pair of adjustable legs, said legs attached to said frame.

4. The hoist of claim 1 wherein said frame is rectangularly shaped.

5. The hoist of claim 1 wherein said frame is formed from steel.

6. The hoist of claim 1 wherein each of said pair of tracks comprise a channel, said rollers positioned within said channels.

7. The hoist of claim 1 wherein said winch is attached to said pulley.

8. A portable hoist device for a truck comprising: a frame mountable on a truck, a first pair of legs, said legs adjustably positioned on said frame, a pair of tracks, said pair of tracks spaced in parallel along said frame, a carriage, said carriage comprising a winch, a cable, said cable wound on said winch, an axle, a pair of rollers, said rollers mounted on said axle, each one of said rollers mounted on different ones of said pair of tracks, a pulley, said pulley suspended from said axle, said cable positioned on said pulley, two pairs of tandem rollers, each of said pair of tandem rollers attached to said winch on opposite sides thereof beneath different ones of said tracks whereby a load can be attached to said cable for lifting by said winch and for movement along said tracks by said rollers.

9. The portable hoist device of claim 8 further comprising a second pair of legs, said second pair of legs adjustably positioned on said frame.

10. The portable hoist device of claim 8 wherein said frame is rectangularly shaped.

11. The portable hoist device of claim 8, wherein said pairs of tandem rollers are attached to said carriage.

12. The portable hoist device of claim 8 and including means to operate said winch, said operating means attached to said winch, said operating means comprising an electric hand drill, a disk gear, said disk gear attached to said winch, a drill connector, said drill connector engaging said disk gear.

13. The portable hoist of claim 8 further comprising:
 (a) a drill connector, said drill connector attached to said winch, and
 (b) a second pair of adjustable legs, said second pair of legs attached to said frame, and
 wherein said frame is rectangularly shaped and formed from steel;
 wherein said pairs of tandem rollers are attached to said carriage;
 wherein each of said pair of tracks comprise a channel, said rollers positioned within said channels; and
 wherein said winch is attached to said pulley.

14. A hoist device for lifting heavy loads onto a truck comprising:
 (a) a frame mountable on a truck,
 (b) a pair of tracks, said pair of tracks supported on said frame,
 (c) a carriage, said carriage comprising:
  i) an axle,
  ii) a pair of rollers, said pair of rollers positioned on said axle and each of said pair of rollers movably positioned on different ones of said pair of tracks,
  iii) a pulley, said pulley suspended from said axle and located directly beneath said axle,
  iv) a winch, said winch disposed substantially parallel to said pulley and behind said axle,
  v) a cable, said cable wound on said winch and positioned on said pulley,
  vi) two pairs of tandem rollers, each of said pair of tandem rollers attached to said winch on opposite sides thereof beneath different ones of said tracks, and disposed beneath and behind said pair of rollers, and wherein said pair of rollers is substantially larger than said pairs of tandem rollers whereby a heavy load can be connected to said cable, lifted by said winch and moved along said pair of tracks with said pair of rollers providing sufficient strength and rigidity to lift the heavy load.

* * * * *